United States Patent
Kim et al.

(10) Patent No.: US 8,935,556 B2
(45) Date of Patent: Jan. 13, 2015

(54) APPARATUS FOR BLOCKING STANDBY POWER OF COMPUTER PERIPHERAL DEVICES DURING AN ABSENCE OF HORIZONTAL/VERTICAL SYNC SIGNALS TO A MONITOR

(75) Inventors: Chang-Ho Kim, Seoul (KR); Young-Bum Kim, Seoul (KR)

(73) Assignee: Chang-Ho Kim, Sindaebang-dong, Dongjak-gu, Seoul (KR)

( * ) Notice: Subject to any disclaimer, the term of this patent is extended or adjusted under 35 U.S.C. 154(b) by 199 days.

(21) Appl. No.: 13/521,145

(22) PCT Filed: Jan. 6, 2011

(86) PCT No.: PCT/KR2011/000094
§ 371 (c)(1),
(2), (4) Date: Jul. 9, 2012

(87) PCT Pub. No.: WO2011/087236
PCT Pub. Date: Jul. 21, 2011

(65) Prior Publication Data
US 2013/0007497 A1    Jan. 3, 2013

(30) Foreign Application Priority Data

Jan. 12, 2010 (KR) .......................... 10-2010-0002517
Jun. 16, 2010 (KR) .......................... 10-2010-0057148

(51) Int. Cl.
  *G06F 1/32* (2006.01)
(52) U.S. Cl.
  CPC ............ *G06F 1/3265* (2013.01); *G06F 1/3218* (2013.01); *G06F 1/3284* (2013.01); *Y02B 60/1242* (2013.01); *Y02B 60/1267* (2013.01)
  USPC ......................................................... 713/324

(58) Field of Classification Search
  CPC ............ G06F 1/26; G06F 1/32; G06F 1/3231; G06F 1/3203; G06F 1/3218; G06F 1/3265; G06F 1/3287; G06F 1/325; G06F 3/14; G06F 1/3284; Y02B 60/1242; Y02B 60/1267
  USPC ......................................................... 713/324
  See application file for complete search history.

(56) References Cited

U.S. PATENT DOCUMENTS

| 5,483,464 A | 1/1996 | Song |
| 5,586,333 A | 12/1996 | Choi et al. |
| 5,603,040 A * | 2/1997 | Frager et al. ................. 713/323 |

(Continued)

FOREIGN PATENT DOCUMENTS

| JP | 7-219470 A | 8/1995 |
| JP | 9-185435 A | 7/1997 |

(Continued)

*Primary Examiner* — Thomas Lee
*Assistant Examiner* — Danny Chan
(74) *Attorney, Agent, or Firm* — Cha + Reiter, LLC

(57) ABSTRACT

The present invention relates to an apparatus for blocking standby power of computer peripheral devices, comprising: a synchronization signal sensing control unit which senses the existence of horizontal and vertical synchronization signals provided to a monitor from a computer body, and outputs a switching control signal according to the sensed result; and a power switching unit which is provided with external power and situated on a power supply path for supplying power to the computer peripheral devices, and has a structure adapted for conducting or blocking the corresponding path according to the switching control signal.

4 Claims, 4 Drawing Sheets

(56) References Cited

U.S. PATENT DOCUMENTS

| | | |
|---|---|---|
| 5,616,988 A | 4/1997 | Kim |
| 6,137,490 A | 10/2000 | Shishido |
| 2003/0204761 A1* | 10/2003 | D'Alessio ............ 713/320 |
| 2005/0086552 A1* | 4/2005 | Matsubara ............ 713/340 |
| 2005/0262367 A1* | 11/2005 | Shih ............ 713/323 |
| 2006/0101294 A1* | 5/2006 | Lee et al. ............ 713/300 |
| 2010/0050003 A1* | 2/2010 | Liebenow ............ 713/310 |

FOREIGN PATENT DOCUMENTS

| | | |
|---|---|---|
| JP | 2004-215481 A | 7/2004 |
| KR | 10-1995-0005216 B1 | 5/1995 |
| KR | 10-0164134 B1 | 9/1998 |
| KR | 10-0934970 B1 | 1/2010 |

* cited by examiner

APPARATUS FOR BLOCKING STANDBY POWER OF COMPUTER PERIPHERAL DEVICES DURING AN ABSENCE OF HORIZONTAL/VERTICAL SYNC SIGNALS TO A MONITOR

CROSS-REFERENCE TO RELATED APPLICATION(S)

The present application claims priority under 35 U.S.C. §365 to International Patent Application No. PCT/KR2011/000094 filed Jan. 6, 2011, entitled "APPARATUS FOR BLOCKING STANDBY POWER OF COMPUTER PERIPHERAL DEVICES", International Patent Application No. PCT/KR2011/000094 claims priority under 35 U.S.C. §365 and/or 35 U.S.C. §119(a) to KPA No. 10-2010-0002517 and 10-2010-0057148 filed Jan. 12, 2010 and Jun. 16, 2010 respectively, which is incorporated herein by reference into the present disclosure as if fully set forth herein.

TECHNICAL FIELD

The present invention relates to a standby power cut-off device for cutting off unnecessary consumption power or standby power for computer peripherals (a monitor, a printer, a speaker, etc.), when a computer is turned off or placed in power saving mode.

BACKGROUND ART

In general, a computer is connected to various peripherals. Among the computer peripherals, there is a device equipped with a self-power cutoff function for saving power, when the computer is placed in power saving mode. For example, a monitor turns off its screen in the power saving mode, thus reducing power consumption to about 15 W. When the computer is turned off, the monitor deactivates its function and enters standby state, consuming usually a standby power of about 4 W. A printer also consumes about 4 W all the time.

As described above, when a computer is in the power saving mode, computer peripherals conventionally consume minimum power to reduce unnecessary power consumption. When the computer is turned off, they consume minimum standby power. Thus, the standby power is always consumed.

DISCLOSURE

Technical Problem

An aspect of embodiments of the present invention is to address at least the problems and/or disadvantages and to provide at least the advantages described below. Accordingly, an aspect of embodiments of the present invention is to provide a device for cutting off unnecessary standby power by cutting off power supply to computer peripherals and thus reducing unnecessary consumption power and standby power to zero without plugging the computer peripherals out, when a computer is placed in power saving mode or turned off.

Technical Solution

A computer body transmits an R.G.B. image signal and an H/V SYNC signal from a graphic controller to a monitor by cable. In power saving mode, one of the H SYNC signal and the V SYNC signal is not transmitted. When a computer is powered off, either of the H SYNC signal and the V SYNC signal is not transmitted. In a standby power cut-off device for a computer peripheral according to the present invention, a sync signal sensing controller inside or outside the computer senses the absence of the H/V SYNC signal in the power saving mode or power-off state of the computer and a power switch opens or blocks a power supply path along which power is supplied to the computer peripheral according to whether the H/V SYNC signal is sensed or not. Thus, power is supplied to the computer peripheral through the power switch.

Advantageous Effects

According to the present invention, when a computer is in power saving mode or turned off, non-output of a horizontal/vertical sync signal is sensed. Then a power switch connected to a peripheral is controlled to cut off power supply to the peripheral, thereby eliminating the power consumption of the peripheral to "0 W". Therefore, the power of the peripheral is saved.

BRIEF DESCRIPTION OF THE DRAWINGS

The above and other objects, features and advantages of certain exemplary embodiments of the present invention will be more apparent from the following detailed description taken in conjunction with the accompanying drawings, in which.

BEST MODE

Reference will now be made in detail to the preferred embodiments of the present invention with reference to the accompanying drawings. While specific details such as an outlet, a transistor, a microcomputer, etc. are described in the following description, they are provided to help comprehensive understanding of the present invention. It will be clearly understood to those skilled in the art that variations or modifications can be made to the specific details within the scope and spirit of the present invention.

Figure 1:
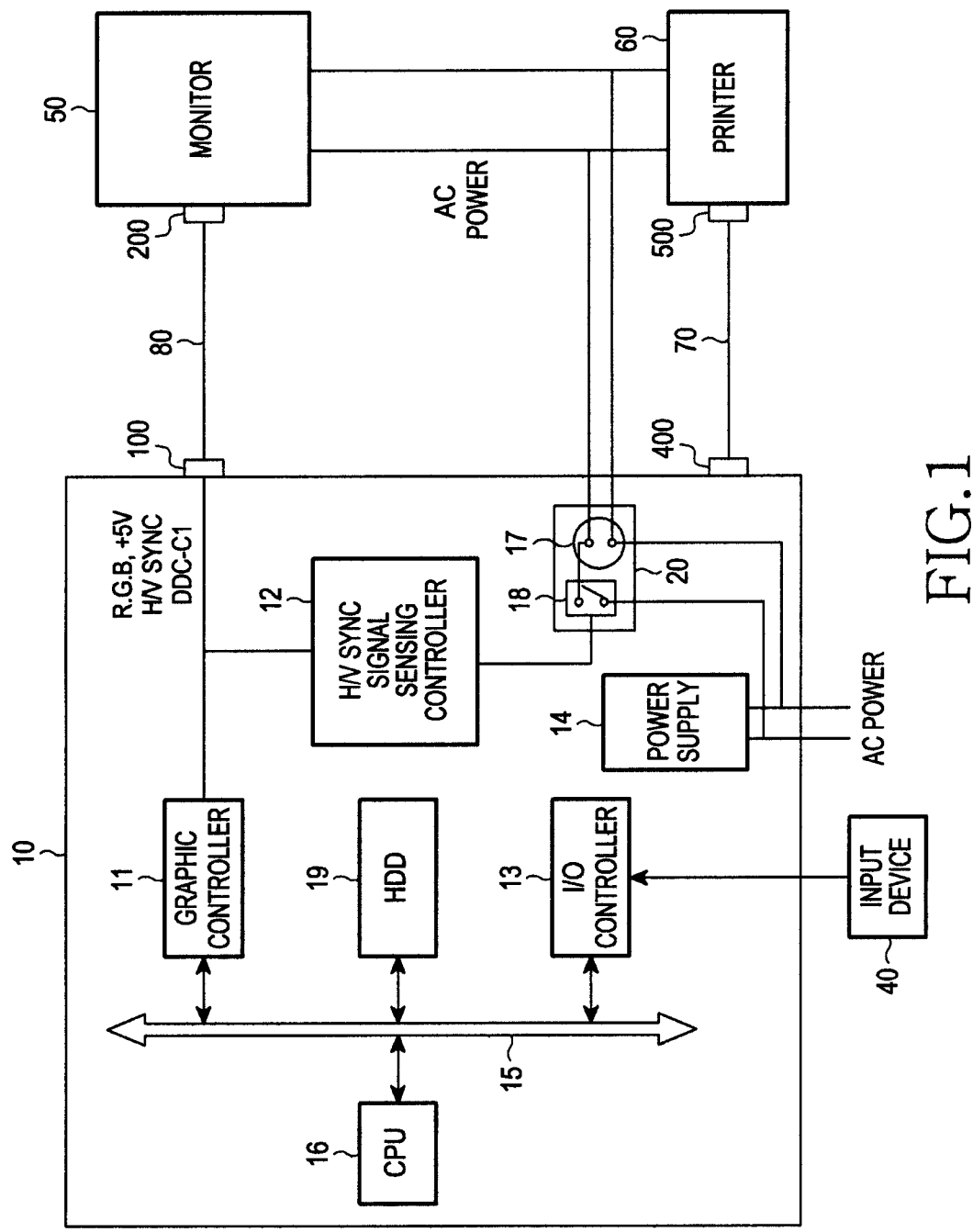
FIG. 1 is a block diagram of computer peripherals and a computer body including a standby power cut-off device for the computer peripherals according to an embodiment of the present invention.

FIG. 1 is a block diagram of computer peripherals and a computer body including a standby power cut-off device for the computer peripherals according to an embodiment of the present invention. The standby power cut-off device according to the embodiment of the present invention includes a sync signal sensing controller 12 and a power switch 20 inside a computer body 10. Referring to FIG. 1, the computer body 10 includes a Central Processing Unit (CPU) 16, a graphic controller 11 for outputting a Red, Green, Blue (R.G.B.) image signal, a Horizontal/Vertical (H/V) SYNC signal, and a monitor setting signal DDC-C1 to a monitor 50, an Input/Output (I/O) controller 13 connected to an input device 50 such as a keyboard, for processing a signal received from the input device 40, a Hard Disk Drive (HDD) 19 for storing an Operating System (OS) and a plurality of OS-based application programs, a system bus 15 for connecting the CPU 16, the graphic controller 11, the I/O controller 13, and the HDD 19 to one another, and a power supply 14 for supplying power to function blocks within the computer body 10 and external peripherals connected to the computer body 10.

The sync signal sensing controller 12 added to the above-described configuration according to the features of the present invention senses power saving mode and power-off state according to the presence or absence of the H/V SYNC signal and outputs a switching control signal to control the power switch 20 according to the sensing.

The power switch 20 is provided in a power supply path along which the power supply 14 supplies power to computer peripherals. The power switch 20 is configured so as to open or block the power supply path according to the switching control signal. Thus power is supplied to the peripherals through the power switch. The power switch 20 provided at a predetermined position in the computer body 10 includes a relay 18 for supplying/cutting off power to the peripherals (e.g. a monitor, a printer, a speaker, etc.) and outlets 17 connectable to power supply connectors of the peripherals.

As a connector 200 of the monitor 50 is connected to a connector 100 of the computer body 10 via a connection cable 80, signals are transmitted between the monitor 50 and the computer body 10. As a connector 500 of a printer 60 is connected to a connector 400 of the computer body 10 via a connection cable 70, signals are transmitted between the printer 60 and the computer body 10.

Figure 2:
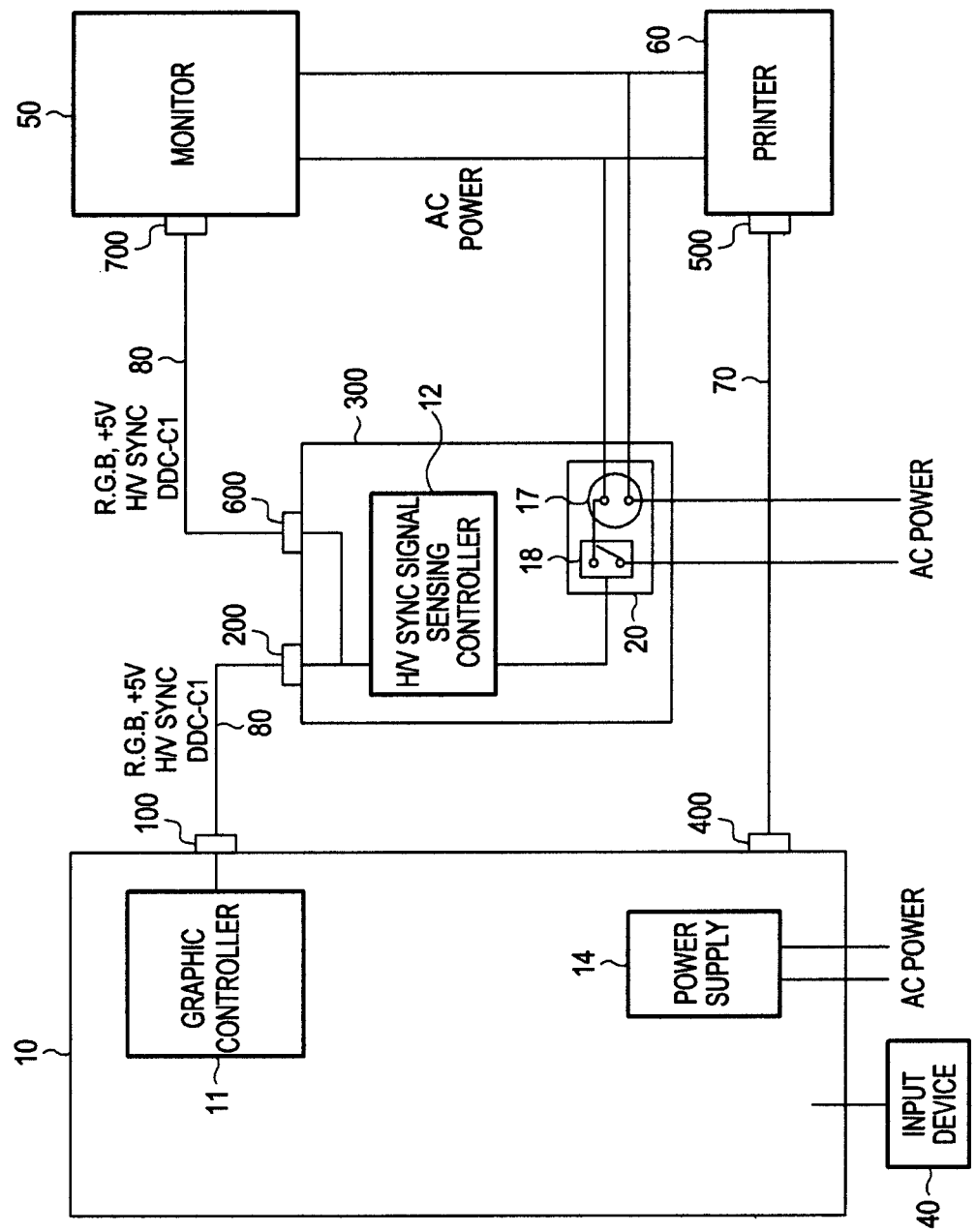
FIG. 2 is a block diagram of computer peripherals and a computer body including a standby power cut-off device for the computer peripherals according to another embodiment of the present invention.

FIG. 2 is a block diagram of computer peripherals and a computer body including a standby power cut-off device for the computer peripherals according to another embodiment of the present invention. A standby power cut-off device 300 according to another embodiment of the present invention is configured as an additional device outside the computer body 10. Therefore, the computer body 10 may have a conventional structure and a general-purpose computer product may be used as the computer body 10.

Referring to FIG. 2, the standby power cut-off device 300 is configured so as to receive an R.G.B. image signal, an H/V SYNC signal, a +5V power voltage signal, and a monitor setting signal DDC-C1 that are directed from the graphic controller 11 of the computer body 10 to the monitor 50. For this purpose, the standby power cut-off device 300 includes a connector 200 connected to the connector 100 of the computer body 10 via the cable 80. To forward signals received from the computer body 10 to the monitor 50, the standby power cut-off device 300 includes a connector 600 connected to a connector 700 of the monitor 50 via the cable 80.

This standby power cut-off device 300 includes the sync signal sensing controller 12 for sensing the power saving mode and power-off state of the computer body 10 according to the presence or absence of the H/V SYNC signal and thus outputting a switching control signal for switching control of the power switch 20 according to the sensing.

The power switch 20 provided in the standby power cut-off device 300 includes the outlets 17 for receiving external power and supplying the power to computer peripherals and the relay 18 provided in a power supply path between an external power supply and the outlets 17, for opening or blocking the power supply path according to the switching control signal.

Figure 3:
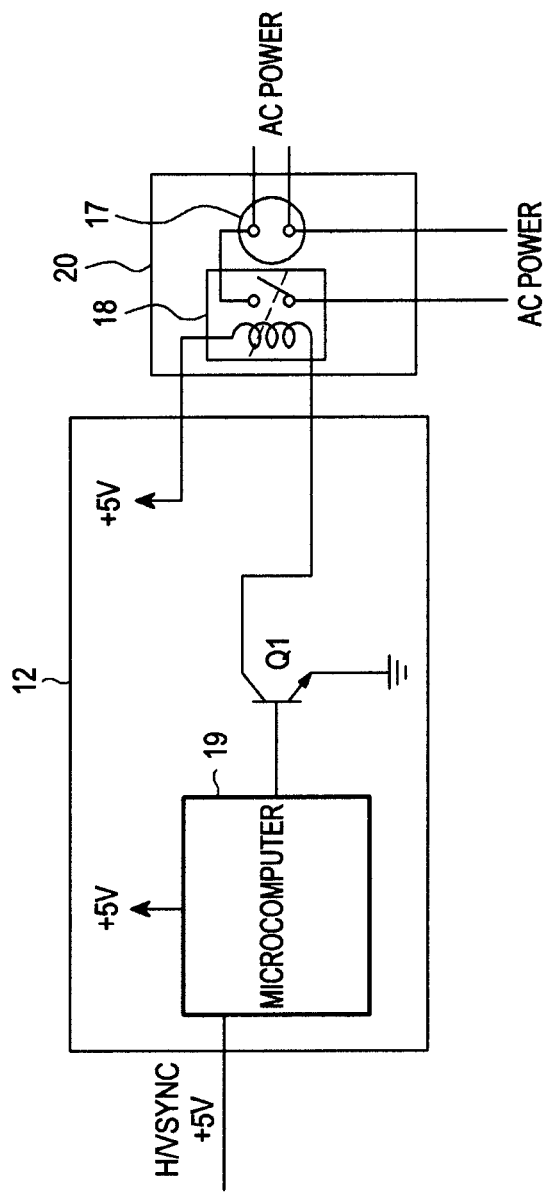
FIG. 3 is an exemplary detailed circuit diagram of a sync signal sensing controller and a power switch illustrated in FIG. 1 or 2.

FIG. 3 is an exemplary detailed circuit diagram of the sync signal sensing controller 12 and the power switch 20 illustrated in FIG. 1 or 2. Referring to FIG. 3, the sync signal sensing controller 12 includes a microcomputer 19 (i.e. a controller) for sensing the presence or absence of the H/V SYNC signal and performing control operations and a switching transistor Q1 for driving the relay 18 of the power switch 12 under the control of the microcomputer 19. For example, the relay 18 may have one coil end for receiving 5V and the other coil end connected to the collector of the switching transistor Q1. The switching transistor Q1 may have a base connected to an output of the microcomputer to be controlled by the microcomputer, and an emitter that is grounded. The relay 18 of the power switch 20 is installed in a path between an external power supply and the outlets 17, for opening or blocking the path.

With reference to FIGS. 1, 2 and 3, an operation of the present invention will be described in detail. If the graphic controller 11 of the computer body 10 has not output either of the H SYNC signal and V SYNC signal for a predetermined time T (e.g. about 5 to 10 seconds), the microcomputer 19 of the sync signal sensing controller 12 determines that the computer body 10 is in the power saving mode or the power-off state. Subsequently, the microcomputer 19 completely cuts off power supply to computer peripherals by opening the power outlets 17 directed to the computer peripherals by turning off the switching transistor Q1 and opening the relay 18 of the power switch 20, thereby preventing power consumption in the power saving mode or standby mode.

If the graphic controller 11 of the computer body 10 normally outputs the H/V SYNC signal, the microcomputer 19 of the sync signal sensing controller 12 turns on the relay 18 of the power switch 20 by turning on the switching transistor Q1 so that power is supplied to the computer peripherals via the power outlets 17 and thus the computer peripherals operate normally. Herein, since the computer body 10 keeps transmitting image signals to the monitor 50, the monitor 50 displays images normally.

Figure 4:
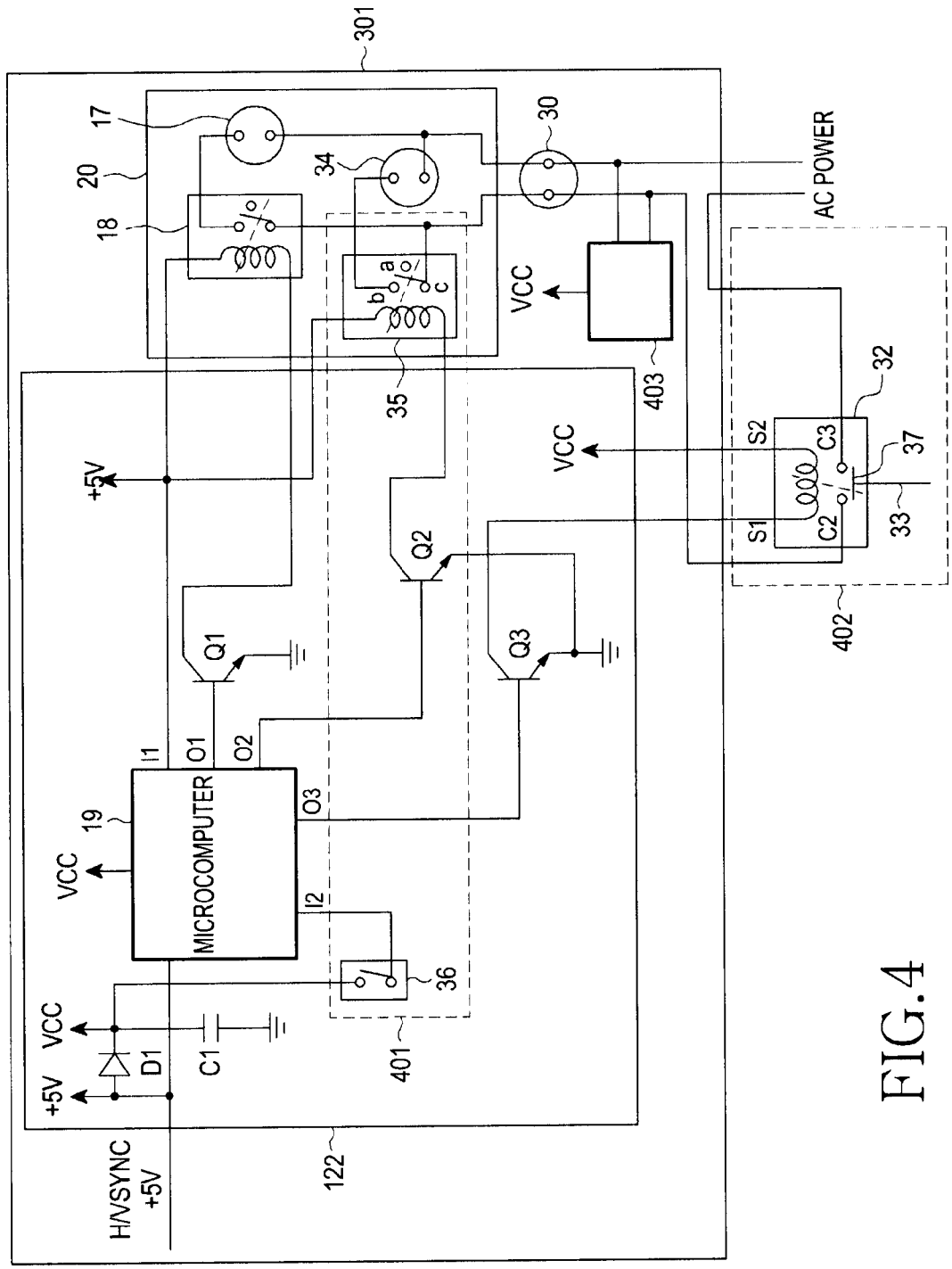
FIG. 4 is a detailed circuit diagram of important parts in a standby power cut-off device for computer peripherals according to a further embodiment of the present invention.

FIG. 4 is a detailed circuit diagram of important parts in a standby power cut-off device for computer peripherals according to a further embodiment of the present invention. Referring to FIG. 4, a standby power cut-off device 301 for computer peripherals according to a further embodiment of the present invention may be configured separately outside the computer body 10, as in the second embodiment of the present invention. Similarly, the standby power cut-off device 301 relays an image signal, a SYNC signal, etc. from the computer body 10 to the monitor 50. This configuration is not shown in FIG. 4, for the convenience sake of description.

Referring to FIG. 4, the standby power cut-off device 301 includes a sync signal sensing controller 122, a power switch 20, a power blocker 402, a power supply 403, and a computer power outlet 30.

The power switch 20 includes a first relay 18 and a first outlet 17 having similar configurations to those illustrated in FIG. 3. In the power switch 20, a connection circuit of a second relay 35 and a second outlet 34 is added in parallel to the first relay 18 and the first outlet 17. The sync signal sensing controller 122 includes a second switching transistor Q2 for driving the second relay 35, in addition to a first switching transistor Q1 for driving the first relay 18. The first and second switching transistors Q1 and Q2 receive control signals from first and second outputs O1 and O2 of the microcomputer 19, respectively. When the first relay 18 is in deenergized state, the first relay 18 keeps cutting off power, whereas when the second relay 35 is in deenergized state, the second relay 35 keeps supplying power.

The above-described configuration is preferably applicable, when a peripheral sharable with other computers, i.e. a printer is connected to the second relay 35 and the second outlet 34. Even in the power saving mode and/or power-off state of the computer body, the microcomputer 19 may keep operation power supplied to the printer connected to the second outlet, aside from a peripheral connected to the first outlet. According to the features of the present invention, the microcomputer 19 may include a so-called share mode selection switch 36 for supplying 5V from the computer body to a second input 12 of the microcomputer 19 or cutting off supply of 5V to the second input 12 of the microcomputer 19 (the share mode selection switch 36 is installed in a manner that allows user manipulation). Thus, the microcomputer 19 may select supply of operation power to or blocking of the operation power from the printer connected to the second outlet 34 according to the manipulation state of the share mode selection switch 36. For example, in the case where a plurality of computers share one printer, this configuration enables other computers to use the printer even though a specific computer is in standby mode.

The standby power cut-off device 301 according to the fourth embodiment of the present invention may further include a structure for completely cutting off the standby power of the computer when the computer body is turned off and supplying power to the computer by a remote controller when the computer body is turned on. To implement this configuration, the microcomputer 19 receives a power voltage of +5V from the computer body via a first input I1 in order to sense power-off of the computer body. If the microcomputer 19 does not sense +5V from the computer body, it determines that the computer body has been turned off.

In addition, the standby power cut-off device 301 includes the power supply 403 for receiving external power (AC power) and supplying operation power VCC to the computer outlet 30 connected to the computer body, the microcomputer 19, and the above-described function blocks, and the power blocker 402 installed in a path of supplying the external power to the computer outlet 30 and the power supply 403, for opening or blocking the path.

The power blocker 402 includes a remote switch 32 for supplying power remotely. The remote switch 32 includes a knob 33 for powering on and a solenoid S1 and S2 for flowing current through contact points C2 and C3 by connecting the contact points C2 and C3 through a plate 37, upon pressing of the knob 33 and cutting off power to the contact points C2 and C3 by receiving an internal power voltage VCC in response to driving of a third switching transistor under the control of the microcomputer 19 and thus detaching the plate from the contact points C2 and C3. Herein, the sync signal sensing controller 122 may further include the third switching transistor Q3 to drive the solenoid. One end S1 of the solenoid is connected to the collector of the third switching transistor Q3 and the other end of the solenoid receives the internal operation power VCC.

Now a detailed description will be given of an operation of the standby power cut-off device having the configuration illustrated in FIG. 4 according to the third embodiment of the present invention. In the case where a printer is shared, the share mode selection switch 36 is in "on" state and thus the input I2 of the microcomputer 19 is "high". In this case, even though the computer body is in the power saving mode, the microcomputer 19 keeps the output O2 "low" so as to deenergize the second relay 35 and thus keep supplying power to the second outlet 34. Consequently, power to the printer is not cut off.

At the same time, the output O1 of the microcomputer 19 is "low" for the other peripherals. Therefore, the first switching transistor Q1 is turned off and the first relay 18 is deenergized, thereby cutting off power to the first outlet 17.

If the computer is placed in normal mode in this state, the second output O2 of the microcomputer 19 is kept "low", thus deenergizing the second relay 35. Therefore, power is kept being supplied to the printer outlet 34. For the other peripherals, the first output O1 of the microcomputer 19 is "high", thus turning on the first transistor Q1 and energizing the first relay 18. Thus, power is supplied to the first outlet 17 and then to peripherals.

On the other hand, when the printer is not shared, the share mode selection switch 36 is "off" and the input 12 of the microcomputer 19 is "low". In this case, when the computer is placed in the power saving mode, the microcomputer 19 sets the second output O2 to "high", thus turning on the second switching transistor Q2 and energizing the second relay 35. Therefore, power to the outlet 34 is cut off.

For the other peripherals, the microcomputer 19 sets the first output O1 to "low", thus turning off the first switching transistor Q1 and deenergizing the first relay 18. Therefore, power to the first outlet 17 is cut off.

Later, if the computer body is in normal mode, the microcomputer 19 sets the second output O2 to "low", thus deenergizing the second relay 35 and supplying power to the second outlet 34. Therefore, the printer is kept powered-on.

For the other peripherals, the output O1 of the microcomputer 19 is "high", thus turning on the transistor Q1 and energizing the relay 18. Therefore, power is supplied to the outlet 17 and then to the peripherals.

Meanwhile, to perfectly cut off the standby power of the computer, when the computer is powered off, +5V is not output. Thus the microcomputer 19 senses the "low" state of the first input I1 and determines that the computer is powered off Subsequently, the microcomputer 19 sets a third output O3 to "high", thus turning on the third switching transistor Q3 and flowing current through the solenoid S1 and S2 of the remote switch 32 in the power blocker 402. As a result, the plate 37 is removed from the contact points C2 and C3 and thus the power blocker 402 blocks power supply, thereby completely blocking even the standby power of the computer.

To power on the computer later, a user presses the knob 33 of the remote switch 32 in the power blocker 402, which is connectable to a position that allows user manipulation by a cable. Then the plate 37 contacts the contact points C2 and C3, thus supplying power. Accordingly, the power supply 403 provides operation power to the microcomputer 19 and power is supplied to the computer body through the computer power outlet 30. Thus, the computer body can operate normally.

If the computer is kept powered-off for a predetermined time T1 (e.g. 5 to 10 seconds), that is, if an operation power voltage of 5V is not received for T1 from the computer body, the microcomputer 19 determines that the computer will not be used and thus is powered off.

Meanwhile, the remote switch 32 may have a switch configuration disclosed in Korea Patent Application No. 2009-72016 entitled "Standby Power Cut-Off Device and Control Method Thereof" and filed on Aug. 5, 2009 by the present applicant.

While the standby power cut-off device 301 is shown in FIG. 4 as separately configured outside the computer body 10, it may further be contemplated as another embodiment that the standby power cut-off device 301 is installed within the computer body 10. In this case, the computer power outlet 30 illustrated in FIG. 4 is not needed and the power supply 403 may basically supply operation power to the computer body 10 as well as to the microcomputer 19 and the above-described function blocks.

In addition, while it has been described above that the microcomputer 19 serves as a controller in the sync signal sensing controller 12, the controller may be configured into a separate chip that detects the H/V SYNC signal, for example, a DVI Receiver chip of 'Silicon Image' provided at the front end of the microcomputer 19.

As described above, the standby power cut-off device may be configured so as to automatically cut off power, when a computer is in power saving mode and power-off mode. While the invention has been shown and described with reference to certain embodiments of the present invention thereof, it will be understood by those skilled in the art that various changes in form and details may be made therein. Therefore, the scope of the invention should be determined by the appended claims and their legal equivalents, not by the above description, and all changes coming within the meaning and equivalency range of the appended claims are intended to be embraced therein.

The invention claimed is:

1. A standby power cut-off device for a computer peripheral,
    comprising:
    a sync signal sensing controller for sensing a presence or absence of a sync signal transmitted from a computer body to a monitor and outputting a switching control signal according to the sensing; and
    a power switch installed in a power supply path along which external power is received and supplied to a peripheral device, the power switch being arranged to interrupt the power supply path based on the switching control signal;
    a first connector connected to a second connector for signal transmission from the computer body to the monitor by a first cable, and a third connector connected to a fourth connector of the monitor by a second cable, for forwarding signals received from the computer body to the monitor;
    wherein the sync signal sensing controller is configured to cause the power switch to interrupt the power supply path when the sync signal is not sensed;
    wherein the sync signal includes at least one of a horizontal sync signal and a vertical sync signal;
    wherein the power switch comprises a first relay for opening or blocking the power supply path and a first outlet connected to the first relay;
    wherein the sync signal sensing controller and the power switch are installed outside the computer body;
    wherein the sync signal sensing controller comprises a first controller for sensing the presence or absence of the sync signal and performing a control operation and a first switching transistor for driving the first relay of the power switch under the control of the first controller;
    wherein the power switch further comprises a second relay and a second outlet, the second relay and the second outlet being connected in parallel to the first relay and the second relay,
    wherein the sync signal sensing controller further comprises a second switching transistor for driving the second relay of the power switch under the control of the first controller, and
    wherein the first relay is open when in a deenergized state and the second relay is closed when in the deenergized state.

2. The standby power cut-off device of claim 1, wherein the sync signal sensing controller further comprises a share mode selection switch for supplying or cutting off power received from the computer body via a second input of the first controller, and the first controller controls the second switching transistor, further taking into account a manipulation state of the share mode selection switch.

3. The standby power cut-off device of claim 1, further comprising:
    a computer power outlet connected to the computer body, for receiving the external power;
    a power blocker installed in a path of supplying the external power to the computer power outlet, for interrupting the path under the control of the first controller and by external switching manipulation,
    wherein the sync signal sensing controller further comprises a third switching transistor for driving the power blocker under the control of the first controller, and
    wherein the first controller further includes a structure for receiving power from the computer body via a first input, and further controls the third switching transistor by sensing power-on/power-off state of the computer body according to whether power reception is sensed.

4. The standby power cut-off device of claim 3, wherein the power blocker comprises a remote switch for supplying power remotely, and
    wherein the remote switch comprises:
    a knob for allowing external switching manipulation;
    a plate for connecting contact points in the power supply path and flowing current through the contact points, upon pressing of the knob; and
    a solenoid for receiving internal power through driving of the third switching transistor under the control of the first controller, removing the plate from the contact points, and thus blocking the power from the contact points.

* * * * *